US006161572A

United States Patent [19]

Credle et al.

[11] Patent Number: 6,161,572

[45] Date of Patent: Dec. 19, 2000

[54] PREMIX DISPENSING VALVE WITH INTEGRAL PRESSURE REGULATION

[75] Inventors: Bennet Gibbon Credle, San Antonio, Tex.; George Leroy Thompson, Snellville, Ga.

[73] Assignee: Lancer Partnership, Ltd., San Antonio, Tex.

[21] Appl. No.: 09/216,217

[22] Filed: Dec. 18, 1998

[51] Int. Cl.[7] ...................................................... F16K 31/12

[52] U.S. Cl. .................... 137/504; 137/614.19; 222/504; 222/564; 251/30.04

[58] Field of Search .............................. 137/504, 614.19, 137/613; 222/504, 564; 251/30.04, 30.05

[56] References Cited

U.S. PATENT DOCUMENTS

| | | | |
|---|---|---|---|
| 2,345,840 | 4/1944 | Strong | 251/118 |
| 2,674,263 | 4/1954 | Rupp et al. | 137/604 |
| 2,899,170 | 8/1959 | Cornelius | 251/122 |
| 2,984,261 | 5/1961 | Kates | 137/504 |
| 3,194,254 | 7/1965 | Zmek | 137/114 |
| 3,295,723 | 1/1967 | Welty | 137/504 |
| 3,323,681 | 6/1967 | Di Vette et al. | 222/76 |
| 3,373,744 | 3/1968 | Kendall | 128/229 |
| 3,380,629 | 4/1968 | Kontra et al. | 222/504 |
| 3,625,402 | 12/1971 | Kulis | 222/504 |
| 4,226,344 | 10/1980 | Booth et al. | 222/504 |
| 4,497,343 | 2/1985 | Brown et al. | 137/614.06 |
| 4,651,971 | 3/1987 | Donahue | 251/118 |
| 4,746,093 | 5/1988 | Scanderbeg | 251/30.04 |
| 5,038,976 | 8/1991 | McMillin | 222/129.1 |
| 5,097,863 | 3/1992 | McCann et al. | 137/504 |
| 5,379,794 | 1/1995 | Brown | 137/75 |
| 5,788,127 | 8/1998 | Hanmer | 222/504 |

*Primary Examiner*—Stephen M. Hepperle
*Attorney, Agent, or Firm*—Christopher L. Makay; Rafael V. Baca

[57] ABSTRACT

A premix dispensing valve assembly for a beverage dispenser includes a housing which includes an inlet to deliver premix fluid, a compensator within the housing for subjecting a controlled pressure drop on the premix fluid which includes an outlet communicating exterior to the housing, and a regulator within the housing for applying a variable dampening effect against high fluid pressures that accompany the premix fluid upon entry into the premix dispensing valve assembly. The regulator is cooperatively linked to the inlet of the housing and communicates with the compensator. As such, integrating the regulator with the compensator optimally allows for premix fluid to maintain a constant pressure and, thus, prevent complications arising from loss of carbonation. The premix dispensing valve assembly further includes a premix delivery channel within the housing for communicating premix fluid from the inlet of the housing to the regulator. The premix dispensing valve assembly may further include a black block assembly positioned within the housing and in communication with the inlet to eliminate the need to depressurize the entire premix beverage dispenser when disassembly of a particular premix dispensing valve assembly is required.

23 Claims, 5 Drawing Sheets

PREMIX DISPENSING VALVE WITH INTEGRAL PRESSURE REGULATION

BACKGROUND OF THE INVENTION

1. Field of the Invention

The present invention generally relates to beverage dispensers and, more particularly, but not by way of limitation, to a beverage dispensing valve assembly with an improved component configuration which actively regulates the rate of flow and resulting pressure of premix fluid that flows therethrough to prevent both the loss of carbonation and the excessive foaming of beverage dispensed.

2. Description of the Related Art

For over sixty years, beverage dispensers featuring premix dispensing valves have maintained a strong market presence. Premix beverage dispensers allow for the mixing of beverage flavored syrup with plain or carbonated water before the resulting premix fluid is delivered to a dispensing valve.

By contrast, beverage flavor syrup as well as plain and carbonated water in postmix beverage dispensers are separately introduced and ultimately mixed within a postmix valve. Postmix beverage dispensers require much of the beverage formation process to be "on-site" in that they require a desired beverage to be mixed by a postmix valve that is typically within a large, stationary postmix beverage dispenser and in that they commonly require a connection with a public water supply as a source for plain and/or carbonated water. By contrast, premix beverage dispensers dispense a final beverage product where the desired beverage is not produced on-site by the beverage dispenser but is, hence, "pre-mixed" before it is introduced to the premix beverage dispenser. As such, premix beverage dispensers are well suited for locations where water is either unavailable or unsatisfactory. This feature also makes premix dispensers highly portable and relatively smaller than postmix beverage dispensers, thus explaining their popularity at sporting and at other outdoor events.

In the past, premix dispensing valves were plagued with complications arising from great extremes in fluid pressure throughout the entire assembly. Typically, premix fluid enters the premix dispensing valve assembly at high pressures, e.g. 60–80 psi (gage); and exits the valve's nozzle near local atmospheric pressure, e.g. 0 psi (gage). Such a drop in pressure occurs over a short distance within the assembly and in a short period of time. Changes in pressure over time often result in carbon dioxide escaping from the carbonated premix fluid, typically through foaming action, or results in carbon dioxide being absorbed by the premix fluid.

In particular, by achieving such a large and rapid pressure drop, many premix dispensing valves in the past experienced unwanted foaming and loss of carbonation due to several primary factors. One such factor results from changes in ambient temperature throughout the day, which causes the pressure in the premix fluid to vary as the ambient temperature warms and cools the premix fluid. A second factor, commonly known as "shock" foaming, occurs when the dispensing valve initially opens and the internal pressure in the valve suddenly drops from a high static pressure to near atmospheric pressure which causes carbon dioxide gas to escape from the premix fluid and, thus, resulting in excessive and unwanted foaming.

As such, current premix dispensing valve assemblies feature compensators to prevent excessive foaming and loss of carbonation due to fluctuations in pressure. Specifically, premix fluid is subjected to a pressure drop as it passes through the smooth and narrow inner surfaces of a compensator and, thus, results in less foaming and little loss of carbon dioxide. However, foaming and loss of carbonation continue to remain as major complications with current premix dispensing valves because such valves lack the ability to interact with and adjust for large and/or rapid changes in pressure as the premix fluid enters the compensator. Compensators, thus, fail to actively compensate for these changes in pressure which often leads to periodic foaming and loss of carbonation.

It is equally disturbing that current dispensing valves cannot be easily adjusted or reset when subjected to large and/or rapid changes in pressure. Adjusting for pressure involves keeping the dispensing valve open with one hand while the other hand adjusts a screw that is positioned within a threaded passageway. The threaded passageway, in turn, links the interior passageways within the assembly, through which premix fluid flows, with the exterior surface of the dispensing valve housing.

Specifically, turning the screw allows for the position of the compensator, within the interior passageways, to be varied. Variation of the compensator's position within the interior passageways, thus, allows for the adjustment of pressure within a current premix dispensing valve assembly. In short, adjusting for significant changes in pressure or resetting pressure after disassembling the dispensing valve assembly is often time consuming and laborious. Moreover, because it is very difficult to adjust for changes in pressure, the ability for current premix dispensing valves to actively control the effects of excessive foaming or loss of carbonation is nonexistent.

Accordingly, there is a long felt need for a premix beverage dispensing valve assembly that, without manual adjustment, actively adjusts for significant changes in pressure and resulting changes in the rate of flow of the premix fluid that flows through the assembly so as to prevent foaming and loss of carbonation of the dispensed beverage.

SUMMARY OF THE INVENTION

In accordance with the present invention, a premix dispensing valve assembly for a beverage dispenser includes a housing which includes an inlet to deliver premix fluid, a compensator positioned within the housing which includes an outlet communicating exterior to the housing, and a regulator positioned within the housing. The regulator is cooperatively linked to the inlet of the housing and communicates with the compensator. The premix dispensing valve assembly further includes a premix delivery channel within the housing for communicating premix fluid from the inlet of the housing to the regulator. The regulator applies a dampening effect against high fluid pressures which characteristically accompany the premix fluid upon entry into the premix dispensing valve assembly.

Accordingly, integrating the regulator into the premix dispensing valve assembly with the compensator allows for the premix fluid to optimally maintain a constant pressure thereby preventing complications arising from changes in pressure. The regulator, in particular, includes a housing which includes an entrance chamber, a contact member positioned within the entrance chamber, an anchor member set within and fixed to the regulator housing at the end opposing the entrance chamber, and a resilient member positioned within the regulator housing and fixed at one end to the anchor member and at an opposing end to the contact member. In particular, the resilient member provides resistance against the premix fluid pushing against the contact member thereby allowing the regulator to regulate the flow rate and level of pressure of the premix fluid. The contact member also defines a hole substantially central of the contact member to facilitate the flow of premix fluid therethrough.

The regulator may further include a contact member guide disposed within the regulator housing, between the regulator housing and the contact member, to facilitate movement of the contact member therein as fluid force is exerted against the contact member. An array of exit holes are formed about the contact member guide for variable amounts of premix fluid to flow therethrough with respect to changing fluid pressure.

The premix dispensing valve assembly may further include a back block assembly positioned within the housing and in communication with the inlet. The back block assembly includes an outlet and a shut off valve assembly that is in operative engagement with the outlet. The shut off valve assembly, in part, enables the premix fluid within the back block assembly to retain a constant pressure; and, thus, the back block assembly eliminates the need to depressurize the entire premix beverage dispenser when disassembly of a particular premix dispensing valve assembly is required.

The premix dispensing valve assembly includes a plunger within the compensator and is movable from a first position that seals the outlet from the compensator to a second position that exposes the outlet from the compensator. The compensator, in turn, includes a pilot valve assembly that is cooperatively engaged with the plunger to reduce the effects of static pressure developed across the premix dispensing valve assembly. The compensator, in effect, creates a smooth, controlled pressure drop to prevent loss of carbonation and foaming as the premix fluid exits the premix dispensing valve assembly into a cup below. Ultimately, the compensator and the pilot valve assembly act in combination to induce a controlled pressure drop within the stream of premix fluid.

The pilot valve assembly includes a pilot valve body, a lifting ring coupled to the plunger, a pilot valve chamber body formed by the coupling of the lifting ring to the pilot valve body, and a pilot valve set within the pilot valve chamber body. The pilot valve, in turn, includes a pilot drum coupled to the plunger, a sealing drum coupled to the plunger below the pilot drum, and a sealing head formed at the end of the sealing drum.

Accordingly, the pilot valve assembly further includes a head seat formed by the lower interior surface of the pilot valve body wherein the sealing head of the sealing drum is set atop and removed from the head seat, via lifting action of the plunger, to act against the static pressure built up within the premix dispensing valve assembly. The pilot valve assembly further includes a main seal positioned within the region formed by the lower central portion of the pilot valve body and a main seat formed by the lower, interior surface of the compensator housing. The main seal is set atop and is removed from the main seat, via lifting action of the plunger, thereby allowing the bulk of premix fluid to exit the outlet of the premix dispensing valve assembly. The pilot valve assembly further includes a guide plate positioned atop the pilot drum and coupled to the plunger, thereby allowing for the pilot valve assembly to be lifted in tandem with the plunger so that the main seal is lifted from atop the main seat to thus allow the bulk of premix fluid to exit the outlet of the premix dispensing valve assembly.

It is, therefore, an object of the present invention to provide a premix dispensing valve assembly for a beverage dispenser whereby integrating a regulator with a compensator optimally allows for premix fluid to maintain a constant pressure and, thus, preventing complications arising from changes in pressure.

Still other objects, features, and advantages of the present invention will become evident to those skilled in the art in light of the following.

DETAILED DESCRIPTION OF THE PREFERRED EMBODIMENT

As required, detailed embodiments of the present invention are disclosed herein; however, it is to be understood that the disclosed embodiments are merely exemplary of the invention which may be embodied in various forms. The figures are not necessarily to scale, and some features may be exaggerated to show details of particular components or steps.

Figure 1:
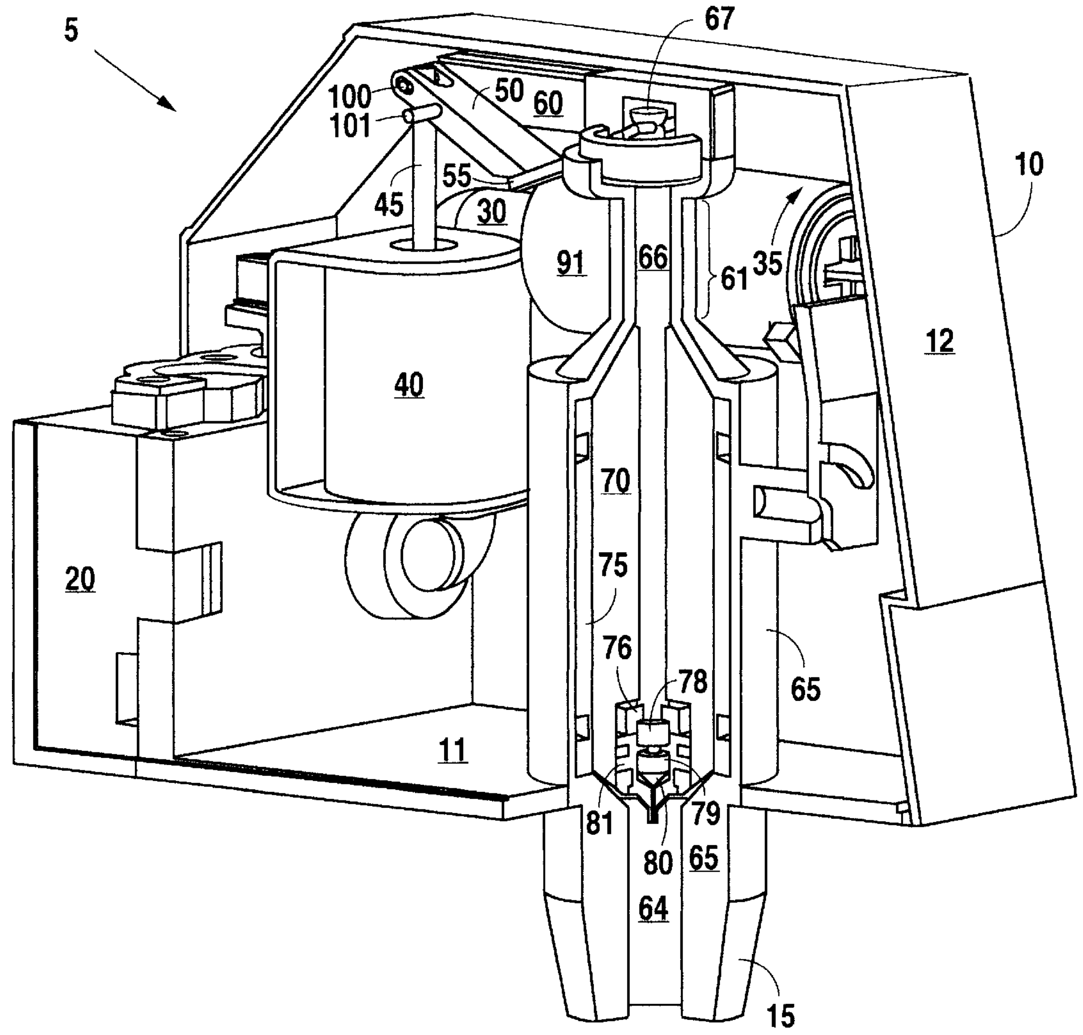
FIG. 1 is a, partially cut away, perspective view illustrating a beverage dispensing valve assembly.
Figure 2:
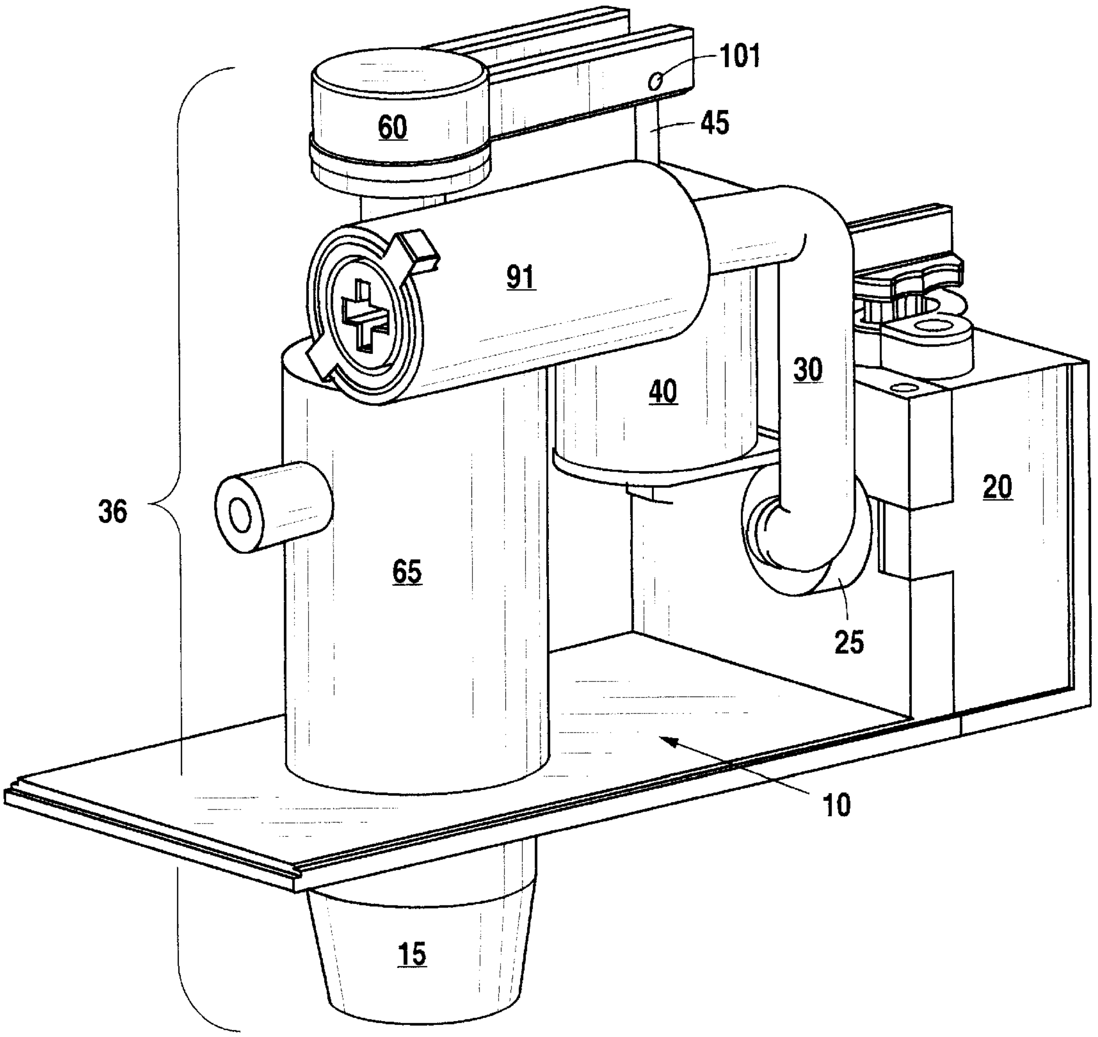
FIG. 2 is a perspective view illustrating components within the beverage dispensing valve through which premix fluid flows.
Figure 3:
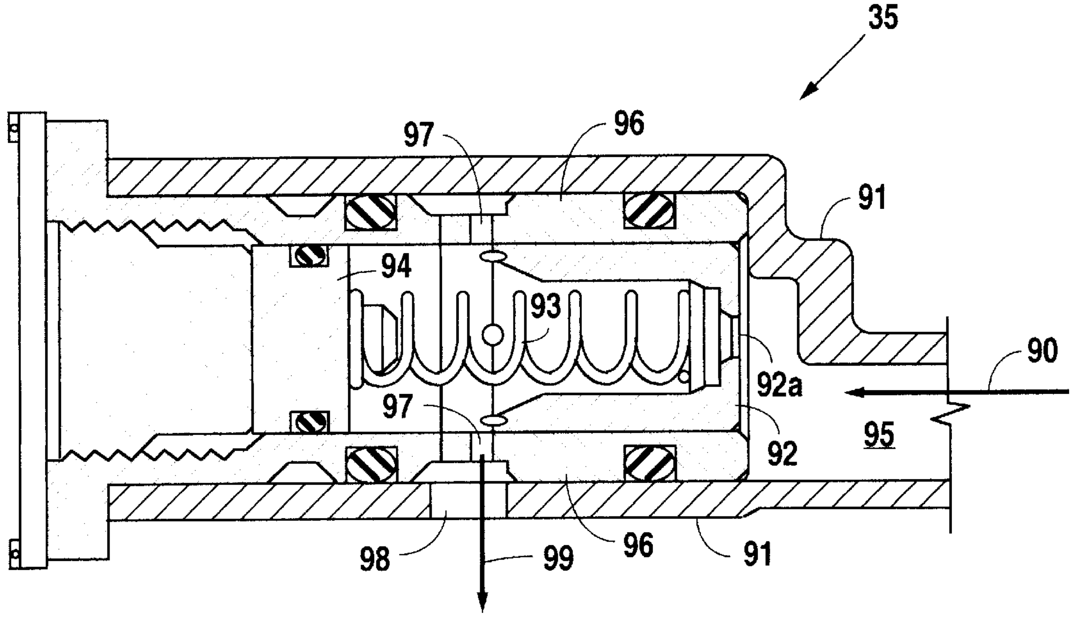
FIG. 3 is a cut away view illustrating a regulator within the beverage dispensing valve.
Figure 4:
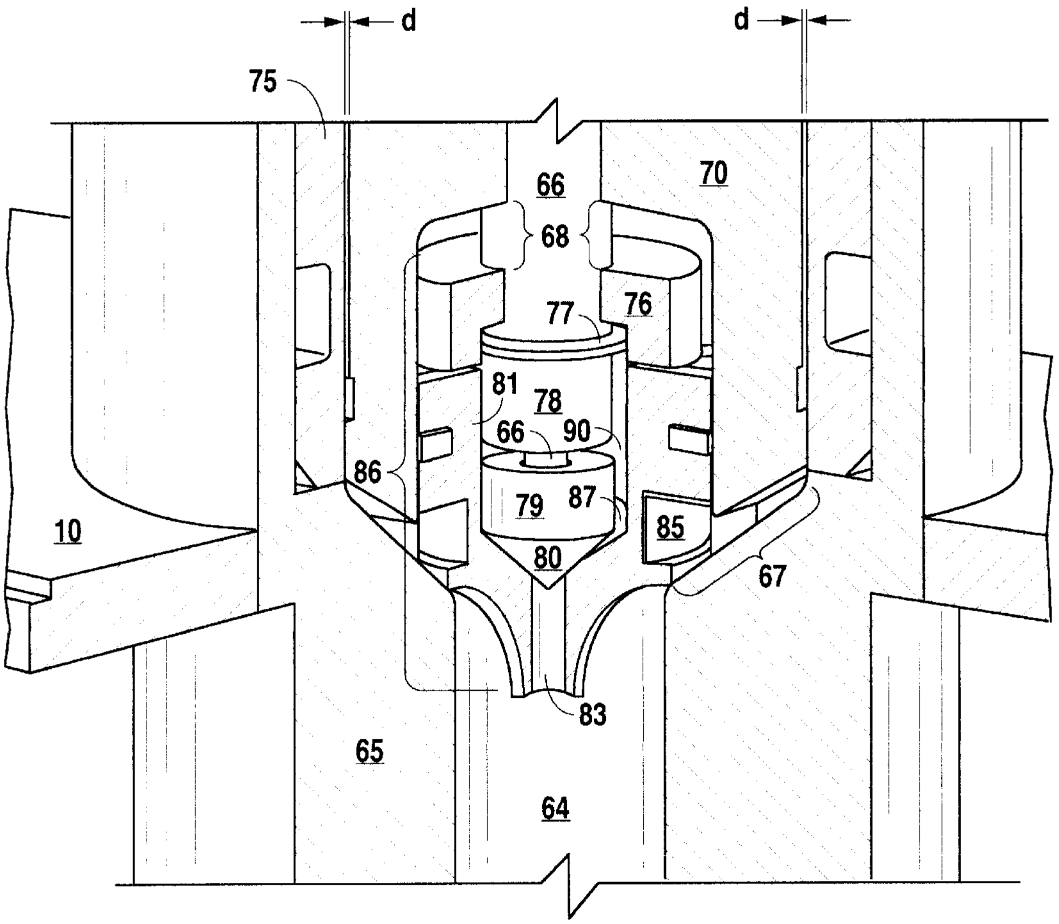
FIG. 4 is a cut away view illustrating a pilot valve assembly in a closed configuration.
Figure 5:
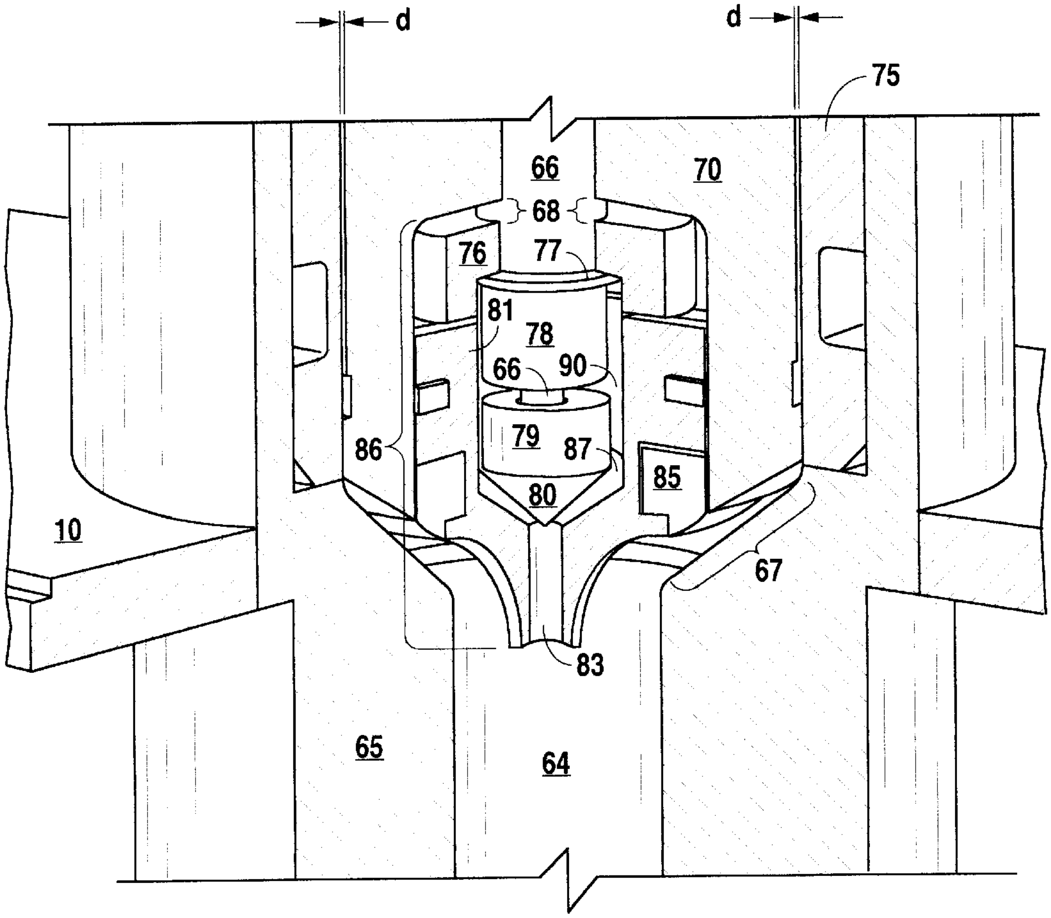
FIG. 5 is a cut away view illustrating the pilot valve assembly in an open configuration.

As illustrated in FIGS. 1–5, premix dispensing valve assembly 5 includes a housing 10, a nozzle 15, a back block assembly 20, a premix delivery channel 30, a regulator 35, and a compensator 36. Compensator 36, in this preferred embodiment, features a cylindrical housing 65 which, at one end, forms an outlet for the premix dispensing valve assembly 5, i.e. nozzle 15; a pressure compensator 70 which is set within housing 65; a compensator sleeve 75 which is positioned between the pressure compensator 70 and the housing 65; a pilot valve assembly 86; and a plunger 66 that is positioned within and along the center line of the pressure compensator 70 and acts to open and close the pilot valve assembly 86.

A premix beverage dispenser (not shown) features several dispensing valves whereby each dispensing valve, typically, is assigned a drink flavor, such as cola, root beer or punch. By placing a cup under a dispensing valve and activating its nozzle, the valve dispenses the desired drink flavor into a cup. As such, premix fluid for the desired drink flavor is created prior to entering, under high pressure, the dispensing valve and is dispensed into the cup near atmospheric pressure.

Housing 10 for the premix dispensing valve assembly 5, in this preferred embodiment, features both a base and back wall 11 that are understood to be permanently affixed, using any suitable connecting means, to form an integral one piece unit. (See FIG. 1). Along with the base and back wall 11, housing 10 features a detachable cover 12, with a top and side walls, that may be removed from the base and back wall 11, especially during cleaning or maintenance. Compensator 36, back block assembly 20, premix delivery channel mount 25, and actuator 40 are components that are fixedly attached to housing 10 using any suitable connecting means.

In particular, back block assembly 20 is mateably connected to the exterior surface of housing 10. Back block assembly 20 features an interior chamber wherein pressure is kept constant through a series of seals and locks. In particular, the back block assembly 20 includes an outlet 21 that allows the premix fluid to flow from the back block assembly 20 to the premix dispensing valve assembly 5. (See FIG. 2). In addition, the back block assembly 20 provides a shut off valve assembly 22 that permits the flow of premix fluid to be shut off by selectively sealing and opening the outlet 21. Thus, because the premix fluid within its interior chamber retains a constant pressure, the back block assembly 20 eliminates the need to depressurize the entire premix beverage dispenser when disassembly of a particular premix dispensing valve assembly is required, especially during cleaning or maintenance. By contrast, valve assemblies without back block components are subject to complete depressurization which results in wasted beverages.

The premix delivery channel mount 25 acts as a connector which allows premix fluid to flow from the back block assembly 20, through the housing 10, and into the premix delivery channel 30. Premix delivery channel mount 25 is fixedly attached, at one end, to the interior surface of housing 10 and connects, using any suitable means, to the premix delivery channel 30 at the opposing end. Because it is mounted at one end to housing 10, the premix delivery channel mount 25 provides anchoring support for the premix delivery channel 30 as it winds its way within the premix dispensing valve assembly 5. In addition, the premix delivery channel mount 25 creates a seal which acts against the unwanted seepage of premix fluid at the connection between the premix delivery channel 30 and the housing 10.

The premix delivery channel 30 comprises any suitable conduit that delivers premix fluid from the back block assembly 20 to the regulator 35. The regulator 35, in turn, connects, using any suitable means, to the premix delivery channel 30.

The regulator 35 is integrated within the premix dispensing valve assembly 5 to eliminate significant disparities in pressure that develop across the premix delivery channel 30 and that develop within the back block assembly 20 as a primary result of shock foaming, fluctuations in ambient temperature, and frequency of use and period between use of the beverage dispenser. Regulator 35 applies a dampening effect against high fluid pressures which characteristically accompany the premix fluid upon its entry into the regulator 35 from the premix delivery channel 30. Accordingly, regulator 35 actively modulates flow rate to a preset level by interacting with and adjusting for the pressure of the incoming premix fluid before the premix fluid flows into the compensator 36 and, thus, provides a constant flow rate regardless of large and/or rapid fluctuations in pressure. Specifically, regulator 35 includes a cylindrical housing 91, an entrance chamber 95 formed by the interior surface of housing 91 at the location where housing 91 connects with premix delivery channel 30, a contact member 92 positioned within entrance chamber 95, an anchor member 94 which is set within and fixed to housing 91, using any suitable securing means, at the end opposing entrance chamber 95, a resilient member 93 that is positioned within housing 91 and is fixed, using any suitable securing means, at one end to anchor member 94 and to contact member 92 at the opposing end. (See FIG. 3). Regulator 35 further includes a contact member guide 96 disposed within housing 91 between the interior portion of housing 91 and contact member 92 to allow contact member 92 to traverse the interior surface of contact member guide 96 as fluid force is exerted against contact member 92. In addition, an array of exit holes 97 are formed about contact member guide 96 to allow premix fluid to flow therethrough.

In operation, premix fluid flows into entrance chamber 95, as indicated by directional arrow 90. The premix fluid then flows into contact member 92. Contact member 92 is supported by resilient member 93, a coil spring in this preferred embodiment, and provides sufficient resistance against the incoming premix fluid in the entrance chamber 95. Contact member 92 defines a hole 92*a* substantially central of contact member 92 to allow premix fluid to flow therethrough. Those skilled in the art will recognize other suitable configurations for a hole or for a series of holes formed about the contact member to facilitate the flow of premix fluid therethrough. The premix fluid thus flows through the hole 92*a* and through the array of exit holes 97 about the contact member guide 96. As such, any changes in the amount of force exerted on the contact member 92 by the premix fluid is proportional to the change in incoming pressure of the premix fluid.

In particular, in response to changes in force, contact member 92 moves along the interior surface of contact member guide 96 until the fluid force is balanced by the opposing spring force of resilient member 93. A varying amount of the area of the holes from the array of exit holes 97 are covered or uncovered as contact member 92 moves along contact member guide 96, until it balances with the force of resilient member 93, to allow for variable amounts of premix fluid to flow therethrough with respect to changing fluid pressure and, thus, regulating the pressure and the rate at which fluid leaves the regulator 35. As indicated by directional arrow 99, the premix fluid ultimately exits regulator 35 through a hole 98 located at the lower portion of regulator 35 and formed by housing 91.

Premix fluid then flows from the regulator 35 into the upper portion of the compensator 36. The stream of premix fluid initially enters into an elongated chamber 61 formed by the interior surface of housing 65. A compensator sleeve 75 is set within and aligned with the center line of housing 65, just after the elongated chamber 61, so as to provide a jacket about the pressure compensator 70 which is also within housing 65. Accordingly, the stream of premix fluid continues to flow from the elongated chamber 61 into a spatial gap created between the pressure compensator 70 and the compensator sleeve 75. It is critical that such a spatial gap retains close tolerancing and extends over a preset optimal distance, d, whereby such an extended, flat area further reduces pressure by inducing a controlled pressure drop. As such, integrating a compensator within a premix dispensing valve assembly significantly reduces the frequency of foaming and loss of carbonation. In this preferred embodiment, the pressure compensator 70 and the compensator sleeve 75 are composed of ceramic material because the physical properties of ceramic best retain a close tolerance.

Ultimately, the stream of premix fluid flows through the lower portion of housing 65, wherein housing 65 cuts though dispensing valve housing 10. It should also be emphasized that housing 10 provides anchoring support for housing 65, and housing 65 is secured to housing 10 using any suitable connecting means. Nozzle 15 is defined by the region of housing 65 just below dispensing valve 10 and includes a nozzle passageway 64, formed by the interior surface of housing 65. Thus, premix fluid flows from the lower portion of housing 65, through nozzle passageway 64, and exits the premix dispensing valve assembly 5 into the cup below.

However, to accommodate the flow from the spatial gap out through to the nozzle 15, a relatively large opening is needed to prevent foaming. Moreover, because the static pressure of the premix fluid (while the premix dispensing valve assembly 5 is closed) is greater than the flowing pressure of the premix fluid (while the premix dispensing valve assembly 5 is open), such an initial static pressure exerts a significant amount of resistance against the requisite forces for opening any kind of valve assembly to expose the large opening. This initial resistance decays when fluid begins to flow though the opening and, thus, pressure at the opening equilibrates with the pressure of the fluid flowing therethrough.

To compensate for this initial resistance, pilot valve assembly 86 is integrated within the premix dispensing valve assembly 5. The pilot valve assembly 86 is set within the lower portion of the pressure compensator 70 and includes plunger 66. Pilot valve assembly 86 includes pilot valve 78–80 which wraps around and is secured to plunger 66 using any suitable connecting means. Pilot valve 78–80, in this preferred embodiment, features a cylindrical pilot drum 78, a cylindrical sealing drum 79, and a conical sealing head 80 that is formed at one end of the sealing drum 79. Pilot valve assembly 86 includes guide plate 77 which is fixed to the top end of pilot drum 78 whereby it wraps around and is secured to plunger 66. Thus, as plunger 66 moves in an upward direction, guide plate 77 and pilot drum 78 travel upward, in tandem with plunger 66, across the distance provided by the gap between guide plate 77 and a lifting ring 76 that is located just above guide plate 77.

Pilot valve assembly 86 further includes a pilot valve chamber body which is defined by the lifting ring 76 from above; a pilot valve body 81 which defines the central and lower portions of the pilot valve chamber body whereby the upper surface of the pilot valve body 81 is secured to the lower surface of the lifting ring 76 using any suitable securing means; and a pilot channel 83, through which premix fluid flows on its path from a pilot valve chamber 90 to the nozzle passageway 64. As such, the pilot valve chamber 90 is thus formed by the interior surface of the pilot valve chamber body and is specifically defined as the volumetric space enclosed by the interior surface of the lifting ring 76 from above and enclosed by the interior surface of the pilot valve body 81 from below.

Accordingly, pilot valve 78–80 travels in tandem with plunger 66, independently of pilot valve body 81, until guide plate 77 contacts lifting ring 76, at which time the entire pilot valve assembly 86 begins moving in tandem with plunger 66. Specifically, the pilot valve 78–80 continues to travel up the distance of the gap created between guide plate 77 and lifting ring 76 until the guide plate 77 atop pilot drum 78 contacts and lifts the lifting ring 76. The distance of this gap, in turn, is preset to allow sufficient time for the pressure of the premix fluid to be reduced by the escape of premix fluid from the pilot valve chamber 90.

Pilot valve assembly 86 further includes a main seal 85 which wraps around the lower central portion of pilot valve body 81. Moreover, main seal 85 is set within the region formed by the lower exterior surface of pilot body 81 and the lower interior surface of the pressure compensator 70. Accordingly, when the pilot valve assembly 86 is in a closed position, main seal 85 and sealing head 80 act, cooperatively, to stop the flow of the stream of premix fluid from the spatial gap, created between the pressure compensator 70 and the compensator sleeve 75, into the nozzle passageway 64. (See FIG. 4).

In particular, while in a closed position, main seal 85 is mated to a corresponding main seat 67 formed by the upper, interior surface of the nozzle portion of housing 65, thereby creating a seal for the large opening that is needed to prevent foaming. In the same manner, while in a closed position, sealing head 80 is mated to a corresponding head seat 87 formed by the lower, interior surface of the pilot valve body 81, thereby creating a seal, relatively smaller than that of main seal 85, for the pilot channel 83.

Thus, in effect, first opening the seal between the sealing head 80 and the head seat 87 helps to decrease the initial static pressure of the premix fluid so as to allow plunger 66 to exert less force, at least one order of magnitude lower, to raise main seal 85 of the pilot valve assembly 86 from its corresponding main seat 67 to, thus, open the large opening. As such, while in this closed state, the pressure of the premix fluid within the pilot valve chamber 90 and within the adjacent region above main seat 85 quickly rises to the overall static pressure of the premix dispensing valve assembly 5, which is typically but not limited to 60–80 psi (gage). Therefore, as previously mentioned, the requisite force to open main seal 85 against this static pressure would be very large.

The pilot valve assembly 86 provides a reducing effect in that it lessens this force requirement by allowing for a much smaller seal, created by sealing head 80 and head seat 87, to be opened first, thereby causing the static pressure of the premix fluid to ultimately drop to that of the much lower flowing pressure, which is typically near atmospheric pressure. Once the pressure of the premix fluid is reduced in this way, the larger main seal 85 can be lifted with relative ease, as compared with the requisite force to raise the main seal 85 to overcome the effects from static pressure without such reducing effect, providing an exit, at the large opening, for the bulk of the premix fluid that is need to fill the cup below.

In operation, the pilot valve 77–80 travels upward with the plunger 66, whereby pilot valve 77–80 is secured to plunger 66, across the distance provided by the gap between guide plate 77 and lifting ring 76. This gap permits sealing drum 78 and sealing head 80, to lift from the mating surface on head seat 87. Upon the lifting of sealing head 80 from head seat 87, the premix fluid within pilot valve chamber 90 begins to flow downward through pilot channel 83 and into the main exit, i.e. nozzle passageway 64.

It should also be emphasized that, initially, when the pilot valve assembly 86 is closed premix fluid flows from the spatial gap, created between the pressure compensator 70 and the compensator sleeve 75, and collects within the pilot valve chamber 90 until the sealing head 80 is lifted. As such, this initial escape of the premix fluid from the pilot valve chamber 90 reduces the surrounding pressure of the premix fluid that is still pooled within the pilot valve chamber 90 and the pressure of the premix fluid within such spatial gap, whereby such spatial gap is communicatively linked with pilot valve chamber 90 through a network of small crevices provided within the pilot valve body 81.

Next, in a manner similar to lifting pilot valve 78–80, the entire pilot valve assembly 86 begins to travel upward in tandem with plunger 66, after guide plate 77 contacts lifting ring 76, across the distance of a gap 68 created between the lower surface of compensator 70 from above and the upper surface of lifting ring 76 from below. (See FIGS. 4–5). In particular, the continued upward movement of plunger 66 pulls the lifting ring 76 upward because lifting ring 76 is then coupled to plunger 66 by guide plate 77. The upward movement of lifting ring 76, in turn, engages the rest of the pilot valve chamber body, especially main seal 85 which is partially set within the pilot valve chamber body, to lift up as well. Thus, main seal 85 is lifted off of the main seat 67 until, ultimately, the large opening is fully exposed. (See FIG. 5). Therefore, with the entire pilot valve assembly 86 in the open position, the remaining bulk of premix fluid is allowed to travel from the spatial gap created between the compensator 70 and compensator sleeve 75, down the interior surface of housing 65, past the open main seal 85, into nozzle passageway 64, out of nozzle 15, and into the cup below.

A specific example regarding the reducing effect of a pilot valve assembly is as follows. Controlled flow is established by allowing premix fluid to flow through a spatial gap of 0.006 inches between a compensator and a compensator sleeve. As such, a relatively large opening, approximately 0.5 inches in diameter, is needed to prevent premix fluid from foaming upon exiting the spatial gap. Without the reducing effect, a 15 pound force is needed at the 0.5 inch opening to act against the static pressure of the premix fluid so as to lift a valve assembly that seals the opening. On the other hand, by utilizing the reducing effect, less than one pound of force is needed to first lift a sealing head component within a pilot valve from a corresponding head seat. Accordingly, once the effects from the initial static-pressure resistance begins to decay within a pilot valve chamber, a force of approximately less than 1.0 pound is needed to lift a main seal from a corresponding main seat and allow for the rest of the pilot valve assembly to be kept open so as to allow the bulk of premix fluid to flow downward through the 0.5 inch opening.

Furthermore, the plunger 66, that is positioned within and along the centerline of the pressure compensator 70, is provided with an upward force by the actuator 40 set within the premix dispensing valve assembly 5. In particular, the actuator 40, a solenoid in this preferred embodiment, is secured to a side wall formed by the interior surface within housing 10 using any suitable connecting means. (See FIG. 1). It must be emphasized that those skilled in the art will readily recognize other suitable and equivalent actuator embodiments, mechanically, electrically, or otherwise, with respect to and in the alternative to the solenoid herein described. As the actuator 40 is activated, an actuator arm 45 lifts upward and pushes against one end of a first lever arm 50, whereby the actuator arm 45 is coupled to that one end by a connector pin 100. The upward motion at the one end of the first lever arm 50, in turn, provides a downward push, at its opposing end, against one end of a second lever arm 55. The opposing end of the second lever arm 55 is coupled to a plunger head 67, located at the upper portion of plunger 66, using any suitable coupling means. Thus, a downward force, exerted by the first lever arm 50, against one end of the second lever arm 55 causes an upward lift, in tandem, of the opposing end and plunger head, which ultimately permits plunger 66 to lift pilot valve 78–80.

Lever arm mount 60 is secured to the upper portion of the compensator 36 and is provided to support the first and second lever arms 50, 55 during operation. Particularly, in this preferred embodiment, lever arm mount 60 is one contiguous piece having a channel portion, for supporting the first and second lever arms 50, 55, and a disk portion, for securing the lever arm mount 60 to the upper portion of the compensator 36. The first lever arm 50 is attached to the channel portion, between the flanges, by fulcrum pin 101. Specifically, as actuator arm 45 lifts upward and pushes against the one end of first lever arm 50, the first lever arm 50 pivots about the fulcrum pin 101 that is attached to the flanges of lever arm mount 60 and, thereby, providing a downward force by the first lever arm 50 upon the second lever arm 55. In the same manner, a second fulcrum point (not shown) that is within the body of lever arm mount 60 converts a downward motion at one end of the second lever arm 55 to an upward lift at the opposing end that is coupled to plunger head 67.

Additionally, the lower surface of the disk portion of lever arm mount 60 meets and is fixed to the upper surface of compensator 36 using any suitable connecting means. In this manner, the channel portion of the lever arm mount 60 is thus anchored to the compensator 36 via the disk portion.

Unlike the premix dispensing valve assembly 5, the pressure across today's premixing valve assemblies must be readjusted for every significant pressure fluctuation. Resetting these premixing valve assemblies, in turn, involves the awkward and laborious method of manually adjusting a screw and repetitiously checking for the effects of each adjustment.

By contrast, the compensator 36, when optimally integrated with the regulator 35 and back block assembly 20, acts as a primary flow rate control for the premix dispensing valve assembly 5. More critically, integrating regulator 35 into the premix dispensing valve assembly 5 just before compensator 36 allows for the premix fluid to maintain a constant pressure and, thereby, preventing loss of carbonation and excessive foaming. Ultimately, this unique combination of regulator 35 and compensator 36 acts to reduce high pressures generated across assembly 5 to near atmospheric pressure and, accordingly, actively control the flow rate across the valve, thereby eliminating the need to constantly reset the pressure and flow rate.

More specifically, the dispensing valve assembly 5 features an electrical switch integrated within the assembly design (not shown), such as a push button. Such a switch enables a customer to initially activate the actuator 40 and, ultimately, the pilot valve assembly 36 so as to regulate, in combination with the regulator 35, high pressures accumulated during the period between use of the beverage dispenser or accumulated as the ambient temperature warms and cools the premix fluid. On the other hand, many of today's premixing valve assemblies feature only a compensator. Such a compensator typically requires activation by manually operating a lever and does not feature an automated actuator. Additionally, because they lack integration and cooperation with a regulator, compensators within today's premixing valve assemblies encounter high pressures, up to 130 psi (gage) but typically between but not limited to 60–80 psi (gage). High pressures, in turn, lead to periodic foaming and loss of carbonation.

Alternatively, compensator 36 no longer has to compensate for a wide range of flow rates and resulting pressures because the range is significantly narrowed by the interactive dampening and modulating capabilities of regulator 35 beforehand. Premix fluid thus exits regulator 35 and enters compensator 36 under a constant flow rate with resulting pressures as low as 10 to 20 psi (gage). Accordingly, the pressure drop across compensator 36 is significantly lower and generally remains constant. Any variations in the pressure drop across compensator 36 depend on the interactive capabilities of regulator 36 as well as whether the spatial gap between the compensator 70 and the compensator sleeve 75 features disparities in tolerancing or features surface defects due to the material quality of the compensator 70 and compensator sleeve 75. However, such variations in pressure are negligible as compared with the extreme pressure fluctuations encountered by current premix valve assemblies that only feature a compensator without integrated means for active flow control.

Compensator 36 acts to reduce the remaining pressure of 10–20 psi (gage), as the premix fluid enters the compensator 36, to atmospheric pressure, as the premix fluid exits from compensator 36 into the nozzle passageway 64. Compensator 36, in effect, creates a smooth, controlled pressure drop across its spatial gap to prevent loss of carbonation and foaming. Additionally, the reducing effect of the pilot valve assembly 86 acts to eliminate complications arising from high static pressure, thereby preventing the occurrence of shock foaming. The reducing effect of the pilot valve assembly 86 also enables the actuator 40 to apply less work to lift the plunger 66 away from the large opening that is needed to prevent foaming.

Furthermore, the back block assembly 20 is implemented within the premix dispensing valve assembly 5 to eliminate the need for depressurizing the entire premix beverage dispenser during maintenance or cleaning. In particular, because the premix fluid within its interior chamber retains a constant pressure, the back block assembly 20 allows for the premix dispensing valve assembly 5 to quickly become operational when disassembly is required so that controlled flow is easily induced within the assembly 5 without foaming or loss of carbonation.

Illustratively, once actuator 40 is activated, premix fluid flows from the back block assembly 20 into the premix delivery channel 30. Premix fluid flows across the premix delivery channel 30 and enters regulator 35 at approximately 60 psi (gage). The interactive dampening and modulating effect by the regulator 35 upon the flowing stream of premix fluid, however, acts to significantly reduce the pressure upon exiting. As such, premix fluid flows from regulator 35 into compensator 36 at approximately 20 psi (gage). The compensator 36 and the pilot valve assembly 86 that is integrated into the lower portion of compensator 36 act in combination to induce a controlled pressure drop within the stream of premix fluid and, thereby, reducing the remaining pressure to near atmospheric pressure as the premix fluid exits from the compensator 36 into the nozzle passageway 64. The premix fluid then exits the premix dispensing valve assembly 5 from nozzle passageway 64 and is dispensed into the cup below.

Although the present invention has been described in terms of the foregoing embodiment, such description has been for exemplary purposes only and, as will be apparent to those of ordinary skill in the art, many alternatives, equivalents, and variations of varying degrees will fall within the scope of the present invention. That scope, accordingly, is not to be limited in any respect by the foregoing description, rather, it is defined only by the claims which follow.

We claim:

1. A premix dispensing valve assembly for a beverage dispenser, comprising:

a housing having an inlet thereto;

a compensator within the housing, the compensator including an outlet communicating exterior to the housing;

a regulator within the housing, wherein the regulator is coupled to the inlet of the housing and communicates with the compensator;

a sealing member, comprising a plunger residing within the compensator and a plunger actuator that moves the plunger from a first position that seals the outlet of the compensator to a second position that exposes the outlet from the compensator; and a pilot valve assembly, comprising a pilot valve body and a lifting ring coupled to the plunger.

2. The premix dispensing valve assembly according to claim 1 further comprising a premix delivery channel within the housing for communicating premix fluid from the inlet of the housing to the regulator.

3. The premix dispensing valve assembly according to claim 1 wherein the compensator comprises:

a compensator housing;

a compensator sleeve within the compensator housing; and a pressure compensator within the compensator sleeve for inducing a controlled pressure drop within the premix dispensing valve assembly.

4. The premix dispensing valve assembly according to claim 3 wherein the compensator and the compensator sleeve are composed of ceramic material.

5. The premix dispensing valve assembly according to claim 1 wherein the pilot valve assembly further comprises a pilot valve chamber body formed by the coupling of the lifting ring to the pilot valve body.

6. The premix dispensing valve assembly according to claim 5 wherein the pilot valve chamber assembly further comprises a pilot valve set within the pilot valve chamber body.

7. The premix dispensing valve assembly according to claim 6 wherein the pilot valve comprises a pilot drum coupled to the plunger.

8. The premix dispensing valve assembly according to claim 7 wherein the pilot valve further comprises a sealing drum coupled to the plunger below the pilot drum.

9. The premix dispensing valve assembly according to claim 8 wherein the sealing drum further comprises a sealing head formed at the end of the sealing drum.

10. The premix dispensing valve assembly according to claim 9 wherein the pilot valve assembly further comprises a head seat formed by the lower, interior surface of the pilot valve body.

11. The premix dispensing valve assembly according to claim 10 wherein the sealing head of the sealing drum is set atop and is removed from the head seat, via the lifting action of the plunger, to act against the static pressure built up within the premix dispensing valve assembly.

12. The premix dispensing valve assembly according to claim 11 wherein the pilot valve assembly further comprises a main seal set within the region formed by the lower central portion of the pilot valve body.

13. The premix dispensing valve assembly according to claim 12 wherein the pilot valve assembly further comprises a main seat formed by the lower, interior surface of the compensator housing.

14. The premix dispensing valve assembly according to claim 13 wherein the main seal is set atop and is removed from the main seat, via the lifting action of the plunger, thereby allowing the bulk of premix fluid to exit the outlet of the premix dispensing valve assembly.

15. The premix dispensing valve assembly according to claim 14 wherein the pilot valve assembly further comprises a guide plate positioned atop the pilot drum and coupled to the plunger thereby allowing for the pilot valve assembly to be lifted in tandem with the plunger so that the main seal is lifted from atop the main seat to thus allow the bulk of premix fluid to exit the outlet of the premix dispensing valve assembly.

16. The premix dispensing valve assembly according to claim 1 wherein the regulator comprises:

a regulator housing including an entrance chamber;

a contact member positioned within the entrance chamber;

an anchor member set within and fixed to the regulator housing at the end opposing the entrance chamber; and a resilient member positioned within the regulator housing and fixed at one end to the anchor member and at an opposing end to the contact member wherein the resilient member provides resistance against premix fluid pushing against the contact member, thereby allowing the regulator to regulate the flow rate and level of pressure of the premix fluid.

17. The premix dispensing valve assembly according to claim 16 wherein the contact member defines a hole to allow premix fluid to flow therethrough.

18. The premix dispensing valve assembly according to claim 16 wherein the regulator further comprises a contact member guide disposed within the regulator housing between the regulator housing and the contact member to facilitate movement of the contact member therein.

19. The premix dispensing valve assembly according to claim 17 wherein the contact member guide defines a plurality of exit holes, formed about the contact member guide, whereby premix fluid flows therethrough with respect to changing fluid pressure.

20. A premix dispensing valve assembly for a beverage dispenser, comprising:

a housing having an inlet thereto;

a compensator within the housing, the compensator including an outlet communicating exterior to the housing;

a regulator within the housing, wherein the regulator is coupled to the inlet of the housing and communicates with the compensator; and a back block assembly within the housing, wherein the back block assembly is in communication with the inlet of the housing, thereby subjecting the premix fluid to constant pressure and retaining such pressure even upon disassembly of the premix dispensing valve assembly.

21. The premix dispensing valve assembly according to claim 20 further comprising a premix delivery channel within the housing for communicating premix fluid from the back block assembly to the regulator.

22. The premix dispensing valve assembly according to claim 21 wherein the back block assembly further comprises an outlet in communication with the premix dispensing valve assembly.

23. The premix dispensing valve assembly according to claim 22 wherein the back block assembly further comprises a shut off valve assembly that resides within the back block assembly in operative engagement with the outlet of the back block assembly and is moveable from a first position that seals the outlet from the premix dispensing valve assembly and a second position that exposes the outlet from the premix dispensing valve assembly, thereby allowing the back block assembly to shut off the flow of premix fluid.

* * * * *